Patented Feb. 5, 1935

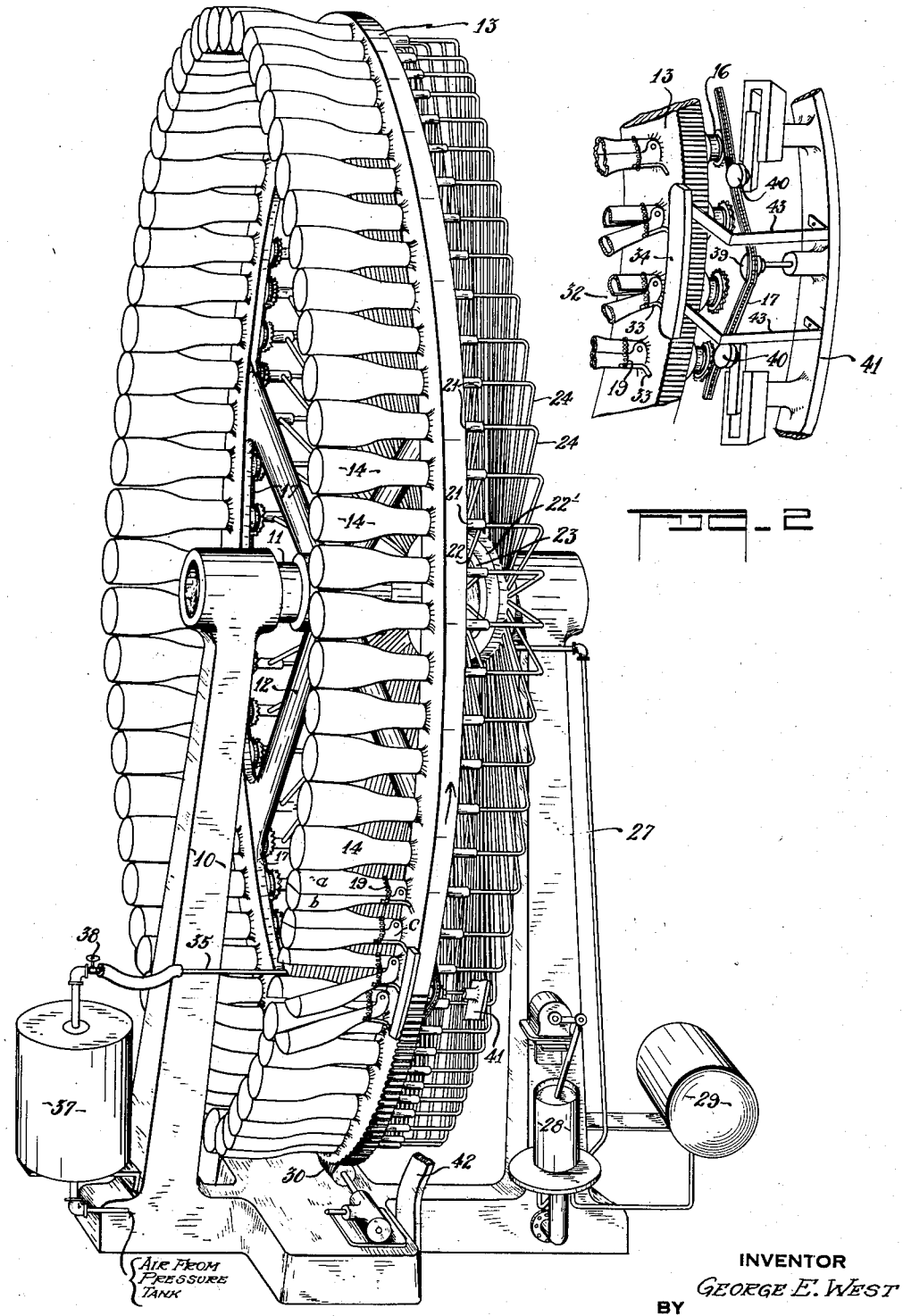

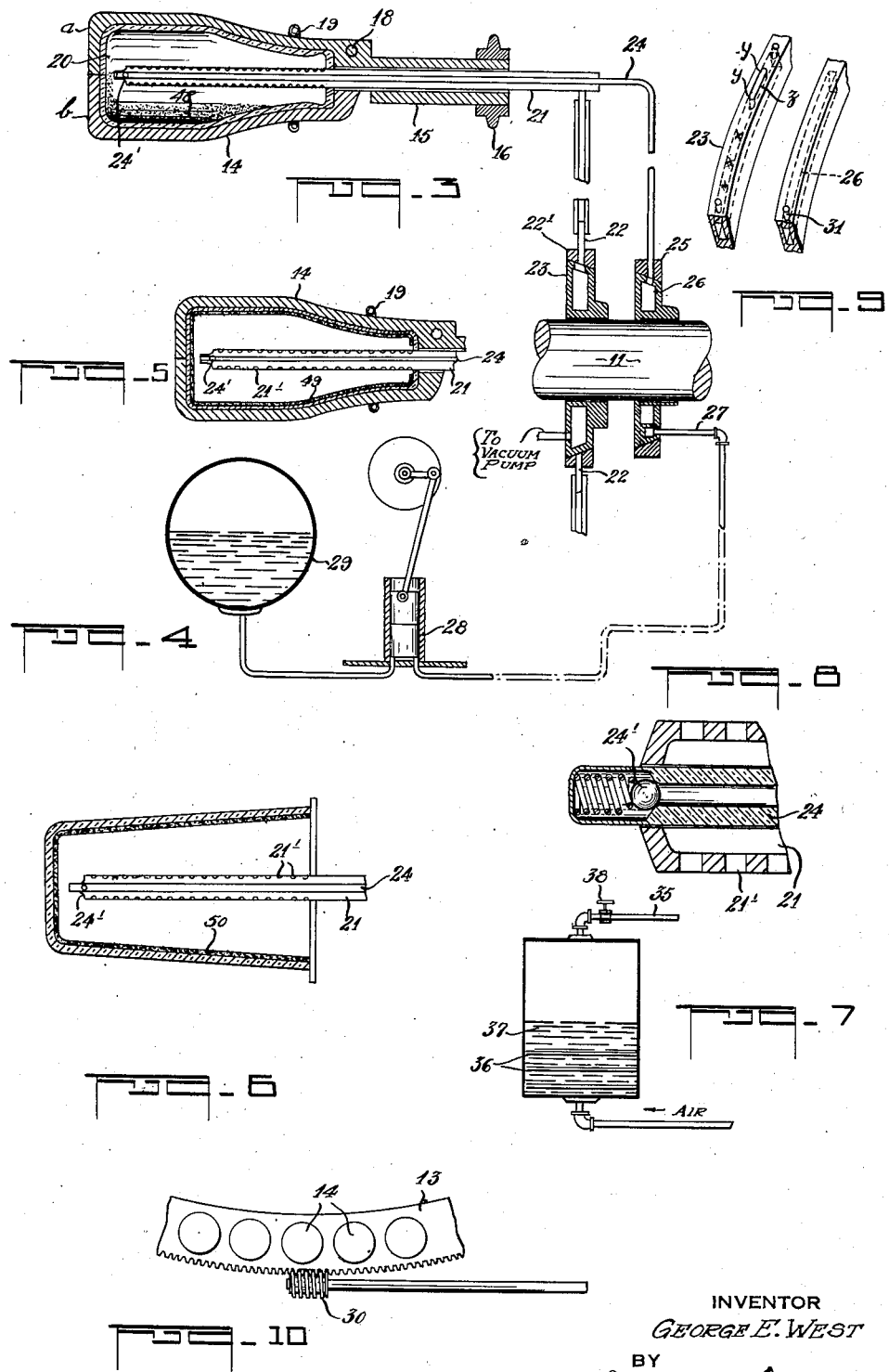

1,990,260

UNITED STATES PATENT OFFICE 1,990,260

APPARATUS FOR MAKING CONTAINERS

George E. West, Washington, D. C.

Application June 8, 1932, Serial No. 616,070

6 Claims. (Cl. 18—26)

This invention relates to a method of and an apparatus for making containers and has for its object the production of transparent, flexible, light weight, non-shatterable containers in the form of bottles, jars, tumblers, cups and other utensils or articles.

Another object includes the production of containers from a liquid solution of a cellulose compound by applying the cellulose compound solution or the container forming material in repeated thin layers within a former or hollow mold and hardening the cellulose compound. That is to say the container is built up or formed on the inner walls of the hollow mold by repeated coatings of the cellulose compound solution being applied to said mold and on the inner walls of the container as the same is built up to any desired thickness. The hardening of the cellulose compound solution is effected by removing the volatile solvent. This may be done by maintaining a partial vacuum in the mold and on the container thus formed. It is, therefore, apparent that the solution is applied under suitable vacuumization to not only hasten the hardening of the cellulose compound but to also prevent the formation of bubbles in the container.

A further object includes the production of milk bottles and other containers from cellulose acetate or other cellulose compounds in an efficient and inexpensive manner.

I have discovered that cellulose material such as cellulose acetate when dissolved in a suitable solvent can be formed into bottles, tumblers and other forms of containers by flowing a liquid solution thereof over the surface of a former or mold and hardening the cellulose material as the same is spread over the surface. While either the inner or outer surface of the former or the mold is available I find that the inner surface of the hollow former or hollow mold is practical. This is because of the nature of the solution and of the finished product. In other words, the cellulose material shrinks when it hardens and the container, therefore, is best made on the inner surface of the mold or former from which it shrinks due to hardening when finished. Then, too, the volatile solvent which forms a part of the solution can be best controlled and eliminated from the inside of the hollow mold or former by maintaining therein a suitable degree of vacuumization and temperature. As a specific instance without limiting myself thereto, I find approximately normal or room temperature to be well suited as a forming temperature and a pressure of between 5 and 25 inches to be well suited in assisting the removal of the solvents and thereby hastening the hardening of the cellulose material. The hardening process progresses slowly as the liquid solution is spread out and exposed to the vacuumizing action within the mold.

It may be said, therefore, that the container is built up and formed by flowing a liquid cellulose solution first over the surface of the mold and then repeatedly applying the coatings as a continuous film to the inner surface of the container as the same is built up and the walls thereof thickened as the solution is hardened and unified with the previous layers.

This mode of procedure is accomplished by placing preferably a predetermined quantity or charge of the liquid cellulose material sufficient to form the container, in a horizontally rotating hollow mold and rotating said mold slowly while vacuumization is maintained therein. The rotation of the mold and the vacuumization therein is maintained until all the charge of the cellulose material has been spread out and hardened in the shape of the container formed within the mold. The rate at which the material is spread out over the successive surfaces is maintained at such a speed as will permit the removal of the volatile solvent which is freed by reason of the material being spread out over the adjacent surface. This spreading is accomplished by rotating the mold at a rate not to exceed the viscosity of the material which will cause the bulk of the charge to remain on the lower side of the rotating mold until the same has been gradually moved out over the surface and spread by reason of the rotating mold and container formed thereon. In this manner successive coatings or films of container material are deposited and built up into a unified structure which, in the finished product, forms the container.

By actual observations I find that a container such as a milk bottle or tumbler can be formed in approximately three and one-half hours. During this time the container has been rotating slowly, that is, at a rate of about three times per minute and vacuumization has been maintained on the inner side thereof. The vacuumization thus maintained withdraws the volatile solvents from the material and hardens the cellulose compound.

While several cellulose compounds are available for my purpose I will, for the sake of clearness confine my description to the use of cellulose acetate dissolved in a suitable solvent and thinned with a thinner if desirable. The cellulose acetate solution suitable for forming containers in the manner above described should be of a consistency of maple syrup so as to flow with considerable ease and still be deposited as a coating or layer on the inner surface of the mold and then on the successive layers of the cellulose material. The following are specific examples of ingredients suitable for my purpose:

1. 20.00 pounds cellulose acetate
   66.37 pounds acetone
   8.62 pounds diacetone alcohol
   5.0 pounds balsam This solution is suitable for film coating under normal temperatures, that is, room temperatures but may be used as a thinner solution in which case more acetone or more acetone and alcohol may be used.

In a suitable and thinner solution the following proportions are used:

2. 8.00 pounds cellulose acetate
   79.25 pounds acetone
   10.75 pounds diacetone alcohol
   2.00 pounds balsam It should be noted that the density of the solution plays an important part in the successful operation of the process. In other words, if the density is too great so that the liquid will not flow with considerable freeness the danger of the formation of bubbles is considerably greater than if the solution is thinner and of a consistency as stated above. I, therefore, do not recommend the exact proportions of the materials above mentioned as conditions require the material to be so liquefied as to operate to best results. This can be done by actual preliminary tests. It may be said, however, that the ranges lie well within the film solution of Example 1 and that of Example 2. These examples are given merely as a guide and not in a limited sense.

I will now describe one form of apparatus suitable for carrying out my invention.

Referring to the accompanying drawings in which—

Figure 1 is a somewhat diagrammatic view in perspective of a machine which embraces the principles of my invention;

Fig. 2 is a view in perspective of a portion of the supporting rim and associated parts at the unloading station and showing mechanism for opening the molds and retaining the same motionless;

Fig. 3 is a view partly in section of a bottle forming mold with a charge of the container forming material deposited in the mold ready for building up containers;

Fig. 4 represents a supply tank and pump for delivering successive charges of container forming material into the mold;

Fig. 5 is a section of a mold showing the container in the shape of a bottle built up on the walls thereof;

Fig. 6 shows a mold and container therein in the shape of a tumbler;

Fig. 7 represents an air containing device for charging air with glycerine to be used in cleaning the open molds;

Fig. 8 is an enlarged sectional view showing a ball valve for the supply pipe;

Fig. 9 is an enlarged view in perspective of a portion of the valve members for supplying the container forming material and for vacuumizing; and Fig. 10 is a plan view of the main drive.

The same reference characters refer to like parts throughout the several views wherever they occur.

The apparatus comprises a frame 10 in which is supported a journal 11 for rotatively suspending a spider 12 thereon. The spider 12 carries the mold supporting rim or ring 13. This ring carries a large number of molds 14 which are rotatively supported therein at 15 and are rotated by means of sprockets 16 engaging with driving means 17 such as a chain or the equivalent. The molds are formed in two parts which, for convenience, may be called the upper section $a$ and lower section $b$. Section $b$ is pivotally mounted on section $a$ by a pivot 18 and these parts are held in closed position by suitable means, such as a spring 19. If desired the inner surface of the mold may be lined by suitable material, such as glass 20. A vacuumizing pipe 21 extends into the mold and is shown within the mold as being perforated at 21'. The outer portion of this pipe is connected by pipe member 22 to the movable valve member 22' which, in turn, articulates with the stationary valve member 23. The stationary portion of the vacuumizing valve 23 is supported on journal 11. Extending into the inner portion of the mold is the supply pipe 24 for delivering to the molds the cellulose container forming material. This pipe is provided with a ball valve 24' for preventing leakage of the liquid supply. This pipe extends through the center portion of the vacuumizing pipe as is shown in Fig. 3. The supply pipe is connected by means of the movable valve member 25 to the stationary valve supply member 26 which is likewise supported on journal 11. A charge of cellulose material sufficient for a container is delivered to the mold through pipe 24, valve member 26, pump supply pipe 27 from pump 28. This pump obtains its supply from a tank 29 as illustrated by Fig. 4. The vacuumization is maintained by any suitable means such as a pump, not shown, through the stationary valve member 23. The supporting rim 13 carrying molds 14 and feed and vacuumizing pipes 24 and 21 respectively, are rotated in unison by means of the worm drive 30. The molds are charged in succession as they pass over the charge port 31 which feeds the supply pipes when in position $c$. The molds are, therefore, each charged at this point. As the rim 13 and molds 14 travel in the direction of the arrow the molds are each rotated slowly as shown in Fig. 3. The container forming material is thus spread out over the inner surface of the mold and is gradually distributed in the course of its travel until the entire charge has been used up and evenly distributed so as to form the container in the manner shown in Fig. 5, the volatile constituents having been withdrawn by reason of the vacuumizing process being continued throughout the operation either continuously or intermittently. It is noted that for best results the vacuumization is suspended for a short period of time and during the time of travel that the mold requires to pass through the first three stages marked by X on Fig. 9. This, for the reason, that bubbles are likely to develop on the material when it is first deposited on the inner surface of the mold. As shown in Fig. 9 the vacuumization is actively effected whenever the ports of pipes 22 register with the stationary ports $yy$. If desired the vacuumization ports may be united by a channel $z$ so as to maintain vacuumization uniformly throughout the operation. When the mold has completed its orbit and reached the discharge station at 32 it is opened and the container is discharged in any desired way and carried off by means, not shown, as a chute or the like. Just prior to the opening the mold sprockets disengage from chain 17 and, therefore, the molds are retained stationary. At this point opening pin 33 engages with cam surface 34 and maintains the mold in open position so as to discharge the container and be cleaned and lubricated by a blast of air containing a lubricating solution such as glycerine and the like. This is effected by any suitable means such as pipe 35. One means of charging the air with glycerine is shown in Fig. 7. Air is bubbled through baffles 36 which are submerged in the liquid in tank 37. A valve 38 may be supplied to regulate the amount of cleaning fluid used. As is best shown in Fig. 2 chain 17 is held apart from sprockets 16 of the molds when open by an idler 39. This idler and the tensioning rolls 40 are supported on stationary frame 41. This frame is fastened to the base at 42. Frame 41 also supports the cam plate 34 by means of supports 43.

From the description just given it is apparent that my invention embraces a continuous operation of forming containers in a plurality of molds. It is obvious that the apparatus may be speeded up and that the molds may be increased to any desired number for mass production.

In Fig. 3 I have shown a mold in the form of a bottle wherein the container forming material has just been deposited and is represented by 48. This material is gradually spread out over the inner surface of the mold by the mold being rotated slowly and vacuumization being maintained in the mold. This rotation and vacuumization is continued until successive layers of the cellulose material, such as cellulose acetate have been completely distributed and unified with the previous layers. This operation when completed produces the container in the shape of a bottle represented at 49 in Fig. 5. In Fig. 6 I have shown a former in the shape of a tumbler wherein the container forming material has been deposited similar to the manner just described and is represented at 50. The repeated coatings spread over the surface and gradually hardened produce a uniformly dense wall of the cellulose material. The material thus formed I believe to be homogeneous throughout and is the result of the repeated coatings of the liquid material being formed over the previous coating which is gradually hardening during the process of forming the container.

Various changes will suggest themselves to those versed in the art and what I, therefore, declare as new and useful and desire to secure by United States Letters Patent is:

1. In an apparatus for making containers, a mold, means for rotating said mold on its axis disposed horizontally, means for simultaneously moving said mold in a circular path, means for injecting a mass of container forming material containing a volatile solvent into said mold, and means for withdrawing the volatile solvent as the same is freed from the solution and the container formed.

2. In an apparatus for making containers, a succession of molds, means for rotating said molds horizontally, means for at the same time moving said molds in the path of a circle, means for injecting a predetermined charge of liquid container forming material into each mold in succession, said container forming material containing a volatile liquefying solvent and a thinning agent, means for withdrawing said solvent and thinning agent as and when the same are volatilized and the containers formed.

3. In an apparatus for making containers, a succession of molds, means for rotating said molds horizontally, means for at the same time moving said molds in the path of a circle, means for injecting a predetermined charge of liquid container forming material into each successive mold, means for creating suction within the molds for the removal of vaporized constituents of the container forming material and for solidifying the said container forming material, and means for cleaning the molds before a new charge is injected therein.

4. In an apparatus for making containers, a succession of molds, means for rotating said molds horizontally, means for at the same time moving said molds in the path of a circle, means for injecting a predetermined charge of liquid container forming material into successive molds, means for creating suction within the molds for the removal of vaporized constituents of the container forming material and for solidifying the said container forming material, and means for cleaning the molds before a new charge is injected therein.

5. In an apparatus for making containers, a succession of molds, means for rotating said molds horizontally, means for at the same time moving said molds in the path of a circle, means for injecting a predetermined charge of liquid container forming material into successive molds, means for creating suction within the molds for the removal of vaporized constituents of the container forming material and for solidifying the said container forming material, means for cleaning the molds before a new charge is injected therein, and means for opening each mold in succession as it reaches the discharging station.

6. A machine for forming containers including a carrier rotatable on a horizontal axis, a plurality of hollow moulds rotatably journaled on the carrier to revolve on a horizontal axis, a supply source of a container forming substance and its solvent, means for delivering a predetermined quantity of the substance into each mould at a predetermined point in the path of the carrier, means for withdrawing the solvent from the mould and means for rotating the carrier on its axis and the moulds on their axes whereby the substance is uniformly spread over the interior of the mould and hardened.

GEORGE E. WEST.